Nov. 22, 1927.

G. A. HAEDERER

DRAFTING INSTRUMENT

Filed Aug. 5, 1926

1,650,269

INVENTOR:

Gustave A. Haederer

By Leon Edelson

Attorney

Patented Nov. 22, 1927.

1,650,269

UNITED STATES PATENT OFFICE.

GUSTAVE A. HAEDERER, OF PHILADELPHIA, PENNSYLVANIA, ASSIGNOR OF ONE-HALF TO LEON EDELSON, OF PHILADELPHIA, PENNSYLVANIA.

DRAFTING INSTRUMENT.

Application filed August 5, 1926. Serial No. 127,392.

This invention relates to drafting instruments and particularly to an irregular curve adapted for use by draftsmen for drawing such irregular curves as the occasion may require.

One of the principal objects of the invention is to provide in such an instrument a means whereby a finer degree of curvature may be obtained than has heretofore been possible.

Another object of the invention is the provision in such an instrument of an inherently flexible portion formed integrally with the main body of the instrument, which flexible portion forms a guide rule having a normally straight line drawing edge but which portion may be flexed to any desired degree of curvature.

Still another object of the invention is the provision of a means for flexing the guide rule portion of the instrument, which means operates essentially on a cam principle to effect a fine degree of adjustment toward the securement of any desired curvature within certain limits.

Still another object of the invention is to produce an exceedingly simple, efficient and inexpensive instrument and the parts of which are so arranged that the entire instrument is of uniform thickness throughout so that there are no projections beyond the plane of the parallel flat surface of the instrument thus making the instrument perfectly reversible.

Further objects, and objects relating to details and economies of construction and operation will definitely appear from the detailed description to follow. In two instances, the objects of the invention are accomplished by the devices and means set forth in the following specification. Structures constituting the preferred embodiment of the invention are illustrated in the accompanying drawings, in which.

In the drawings, the same reference numerals refer to the same parts throughout the several views.

Figure 1:
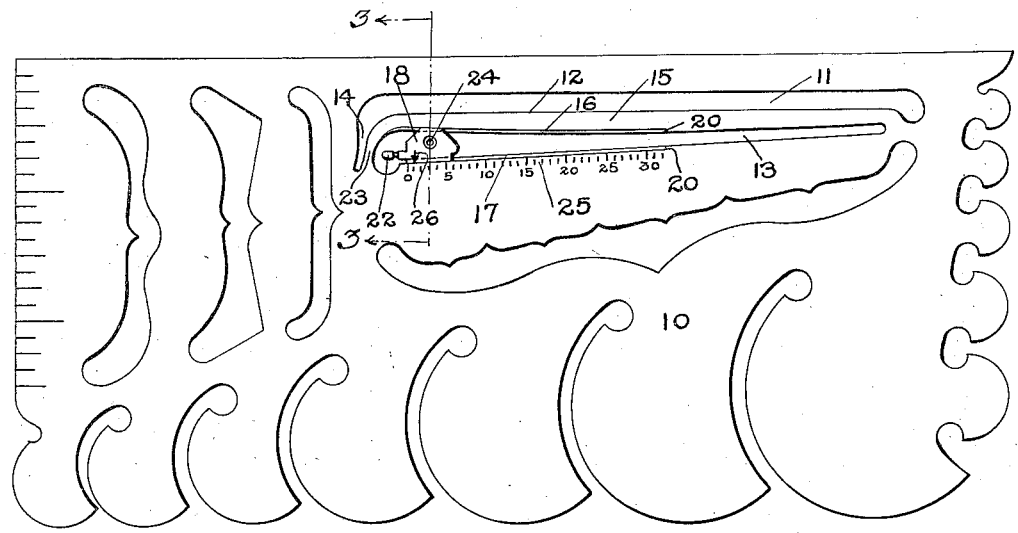
Fig. 1 is a top plan view of the instrument embodying the invention and in which the guide rule portion of the instrument is shown in its normally straight line position.

Referring more particularly to the drawings, it will be seen that the instrument essentially comprises a main body member 10 which may be formed of celluloid, xylonite, amber, wood, metal or any other composition having the requisite degree of flexibility. In Fig. 1, this main body is shown provided with a number of irregular curves, but it is to be understood that the invention is likewise applicable to a simple body member in the form of a scale or ruler of the form shown more particularly in Fig. 4.

In the construction shown in Fig. 1, the main body member 10 is provided in one portion thereof with an elongated slot or opening 11 to provide a drawing edge 12 for the instrument. Immediately below this slot or opening 11 is provided a second slot or opening 13 substantially co-extensive with the upper opening 11. The lower opening 13, however, is of varying width, the maximum width being at one end of the opening. The upper slot or opening 11 is provided with a laterally extending portion 14 lying to one side of the end of the slot 13 which is of greatest width. By so providing the openings 11 and 13 there is formed intermediate the two, an integral guide rule strip 15 which, by reason of the flexible nature of the material of which the instrument is made, may be flexed within certain limits to provide any desirable curvature to the drawing edge 12 of the guide rule.

Disposed within the space 13, that is between the adjacent edges 16 and 17 of the guide rule portion and the main body member, respectively, is a member 18 arranged for longitudinal sliding movement. This member 18 is of substantially the same thickness as that of the main body 10 of the instrument. The adjacent edges 16 and 17 are beveled or chamfered for engagement with notches or grooves 19—19 in the upper and lower edges of the sliding member 18, thus providing a means for effectually retaining the member in place and constituting guides upon which the latter may be longitudinally moved for effecting the desired curvature of the flexible guide rule portion 15 of the instrument.

Figure 2:
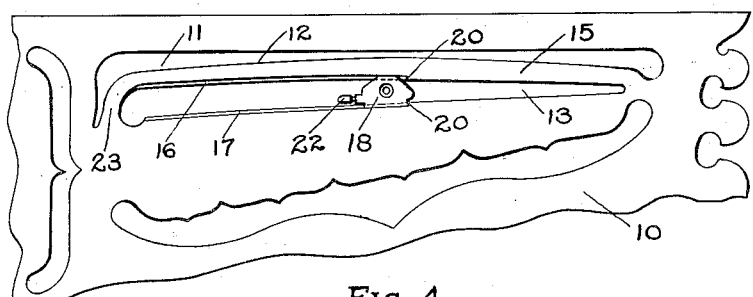
Fig. 2 is an enlarged view of the guide rule portion of the instrument showing the guide rule in its flexed or curved position.

As is most clearly shown in Fig. 1, the opposing edges 16 and 17 of the slot 13 are beveled throughout for a considerable portion of their length, the points 20—20 constituting stops for limiting the degree of movement of the sliding member 18 in one direction and which stops accordingly define the maximum degree of curvature which may be imparted to the flexible strip or guide rule 15. In Fig. 2, the member 18 is shown moved to its extreme forward position as defined by these stops 20—20 and it will be seen that the drawing edge 12 of the guide rule 15 now defines a line of decided curvature. The member 18 is provided, as shown in Figs. 1 and 2, with a rearwardly projecting finger 22, the point of which is adapted to abut against the downwardly projecting portion 23 of the guide rule at the rear end thereof, thus constituting a rear stop for the sliding member 18. The member 18 is apertured as at 24 to permit the insertion thereto of a pointed instrument, such as for instance a pencil, in order to permit the more ready and convenient manipulation of the sliding member 18 to any point between the stops 20 and 23.

A suitably graduated scale 25 is provided along the beveled edge 17 and an index 26 is provided on the sliding member 18 so that the latter may be readily and accurately adjusted to some predetermined position. It thus becomes possible to obtain any desired curve within the limits of this instrument simply by moving the member 18 such that its index coincides with any desired point on the scale 25, the value of which feature should be readily apparent to the draftsman who has heretofore attempted to accurately reproduce a curve with the aid of a fixed irregular groove.

Figure 4:
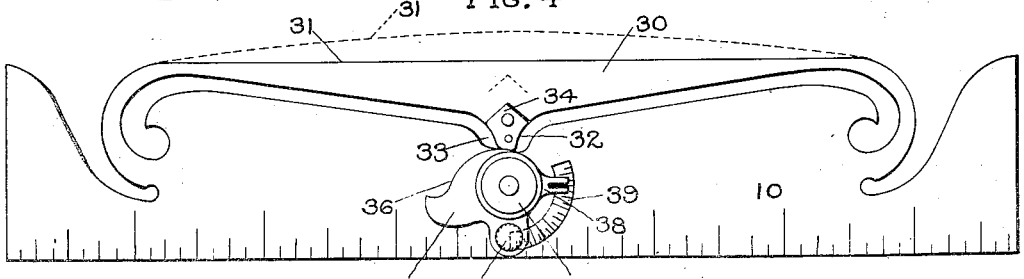
Fig. 4 is a top plan view of a modified form of the instrument showing another means for varying the curvature of the guide rule.
Figure 3:
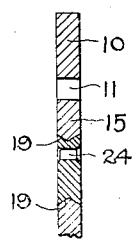
Fig. 3 is a section taken through the line 3—3 of Fig. 1.

In Fig. 4 is shown a modification of the invention disclosed in Figs. 1 to 3, in this case the instrument being in the form of an elongated scale or ruler. In a manner very similar to that disclosed in Fig. 1, the main body 10 of this scale or ruler is provided with an integrally formed strip or guide rule 30, the edge 31 of which constitutes the curved drawing edge of the instrument. As will be understood from the foregoing description, a space is provided between this guide rule portion and the main body of the instrument so that a certain degree of flexibility may be imparted to the guide rule portion. The guide rule 30 is provided with a point 32 arranged for disposition within a notch 33 formed in the main body member 10 intermediate the ends thereof. This point 32 may be provided with a protecting cover 34 if desired.

Disposed beneath the notch 33 suitably mounted upon the main body member 10 is a pivotally supported member 35 provided with a cam face 36. A knob 37 is provided for operating this cam member 35 such that upon rotation of the latter upon its pivot, the cam face 36 will co-act with the point 32 of the guide rule portion 30 of the instrument to force the latter away from the main body 10 and thus impart a curvilinear outline to the drawing edge 31 of the guide rule.

The cam member 35 is provided with an index finger 38 arranged to co-operate with an arcuately shaped graduated scale 39 for the purpose of setting the instrument for any predetermined degree of curvature. In this particular embodiment of the invention, there have been provided no limiting stops but instead a member 40 has been provided which is arranged to frictionally engage the main body portion 10 in a suitable manner whereby the cam member 35 may be held in any desired fixed position. It is to be understood that in this modification as disclosed in Fig. 4 the operating means for effecting variation in curvature of the guide rule 30 may be so arranged that its surface is substantially flush with the surface of the instrument proper.

It is to be understood that the instrument may be made in various sizes and forms depending altogether upon the character of the work with which it is to be used and in view of this, I am aware that the particular embodiments of my invention are susceptible of considerable variation without departing from the spirit thereof. I desire, therefore, to claim the invention broadly, as well as specifically, as indicated by the appended claims.

What I claim as new and useful is:

1. A drafting instrument comprising a main body member, an integral portion thereof arranged for relative movement with respect to said main body member, and means arranged for slidable movement longitudinally of said integral portion for varying the degree of curvature imparted thereto by said means.

2. A drafting instrument comprising a main body member, a flexible strip integrally secured at its ends to said main body member, the adjacent edges of said body member and said strip being spaced from each other, and an element disposed in said space and arranged for varying the position of said strip with respect to said main body member.

3. A drafting instrument comprising a main body member, a flexible strip secured at the ends thereof to and substantially disposed in the plane of said body member, and means movably associated with said body member, said means being longitudinally slidable with respect to said strip to vary the degree of curvature of the latter.

4. A drafting instrument comprising a main body member provided with an integrally formed ruling guide adapted for flexure toward and away from said main body member, and cam means disposed between said body member and said guide and arranged to slide longitudinally therebetween for imparting a predetermined curvature to said ruling guide according to the position of said cam means.

5. A drafting instrument comprising a body member, an integral ruling guide formed thereon, the adjacent edges of said body member being longitudinally variably spaced from each other, and means disposed within said space and arranged for slidable movement therein to vary the degree of curvature of said ruling guide.

6. A drafting instrument comprising a body member, an integral ruling guide formed thereon, the adjacent edges of said body member being longitudinally variably spaced from each other, and means disposed within said space and arranged for slidable movement therein to vary the degree of curvature of said ruling guide, all of the elements of said drafting instrument being of substantially the same thickness and disposed in substantially the same plane.

7. A drafting instrument comprising an inherently flexible ruling guide fixed at the ends thereof to a supporting body member, slidable means arranged for co-action with said guide intermediate the ends thereof for imparting a predetermined degree of curvature to the drawing edge thereof, a scale on said body member and an index on said means.

8. A drafting instrument comprising a body member provided with an integrally formed ruling guide, and a sliding element for imparting a varying degree of curvature to said ruling guide, said body member being provided with stops for confining the movement of said sliding element within certain limits.

Signed at Philadelphia, county of Philadelphia, State of Pennsylvania, this 3rd day of August, 1926.

GUSTAVE A. HAEDERER.